（12） United States Patent
Chen et al.

(10) Patent No.: US 8,964,902 B2
(45) Date of Patent: Feb. 24, 2015

(54) METHOD AND APPARATUS FOR ELIMINATING DIRECT CURRENT OFFSET

(75) Inventors: Jiangshan Chen, Beijing (CN); Zhenguo Ma, Beijing (CN); Liyong Yin, Beijing (CN)

(73) Assignee: ST-Ericsson Semiconductor (Beijing) Co., Ltd, Beijing (CN)

( * ) Notice: Subject to any disclaimer, the term of this patent is extended or adjusted under 35 U.S.C. 154(b) by 119 days.

(21) Appl. No.: 13/882,761

(22) PCT Filed: Nov. 14, 2011

(86) PCT No.: PCT/CN2011/082130
§ 371 (c)(1),
(2), (4) Date: Jul. 16, 2013

(87) PCT Pub. No.: WO2012/065529
PCT Pub. Date: May 24, 2012

(65) Prior Publication Data
US 2013/0294545 A1    Nov. 7, 2013

(30) Foreign Application Priority Data
Nov. 16, 2010 (CN) .......................... 2010 1 0547205

(51) Int. Cl.
*H04L 25/06* (2006.01)
*H04L 27/22* (2006.01)
(52) U.S. Cl.
CPC ............... *H04L 25/061* (2013.01); *H04L 27/22* (2013.01)
USPC ........... 375/319; 375/261; 375/269; 375/279; 375/329
(58) Field of Classification Search
CPC .................................................. H04L 27/2647
USPC ........................................................ 375/319
See application file for complete search history.

(56) References Cited

FOREIGN PATENT DOCUMENTS

CN         1314039 A     9/2001
CN      101310437 A    11/2008
(Continued)

OTHER PUBLICATIONS

International Search Report issued in corresponding International application No. PCT/CN2011/082130, mailing date Mar. 1, 2012.

*Primary Examiner* — Lihong Yu
(74) *Attorney, Agent, or Firm* — Patent Portfolio Builders PLLC

(57) ABSTRACT

The present invention provides a method and an apparatus for eliminating direct current offset. The method comprises the steps of: calculating Euclidean distances between every two demodulation symbols of a plurality of demodulation symbols based on Quadrature Phase Shift Keying (QPSK) modulation; determining four sets from the plurality of demodulation symbols in accordance with the Euclidean distances between the demodulation symbols, each set corresponding to a modulation direction for the QPSK modulation; performing Euclidean distance weighted summation on the determined four sets respectively, and selecting a demodulation symbol with the minimum weighted summation value from each set as a rough estimation point for the QPSK modulation, so as to obtain four rough estimation points; re-determining four sets from the plurality of demodulation symbols in accordance with the Euclidean distances between the demodulation symbols and the rough estimation points; performing Euclidean distance weighted summation on the re-determined four sets respectively, and selecting a demodulation symbol with the minimum weighted summation value from each set as a precise estimation point; and performing direct current offset calculation and compensation in accordance with the precise estimation points. The present invention can improve the demodulation performance of a system.

22 Claims, 7 Drawing Sheets

(56) References Cited

FOREIGN PATENT DOCUMENTS

| CN | 101741790 | A | 6/2010 |
|----|-----------|---|--------|
| CN | 102035771 | A | 4/2011 |
| WO | 2010/039764 | A1 | 4/2010 |

METHOD AND APPARATUS FOR ELIMINATING DIRECT CURRENT OFFSET

TECHNICAL FIELD

The present invention relates to a field of wireless communication technology, in particular to a method and an apparatus for eliminating direct current offset.

BACKGROUND

In a wireless communication system, there exists direct current offset in a received signal output via a radio frequency circuit due to the time-varying characteristics of a transmission channel. Such direct current offset will have an adverse impact on the equalization and correct demodulation of the received signal, and in the worst situation it will dramatically decrease the demodulation performance of the received signal.

Hence, how to eliminate the direct current offset in the received signal becomes an urgent technical problem to be solved.

SUMMARY

The present invention aims to provide a method and an apparatus for eliminating direct current offset, so as to estimate and eliminate the direct current offset in a received signal in an accurate manner, thereby to improve the demodulation performance of a system.

In order to solve the above-mentioned technical problem, the present invention provides a method for eliminating direct current offset, comprising:

calculating Euclidean distances between every two demodulation symbols of a plurality of demodulation symbols based on Quadrature Phase Shift Keying (QPSK) modulation;

determining four sets from the plurality of demodulation symbols in accordance with the Euclidean distances between the demodulation symbols, each set corresponding to a modulation direction for the QPSK modulation;

performing Euclidean distance weighted summation on the determined four sets respectively, and selecting a demodulation symbol with the minimum weighted summation value from each set as a rough estimation point for the QPSK modulation, so as to obtain four rough estimation points;

re-determining four sets from the plurality of demodulation symbols in accordance with the Euclidean distances between the demodulation symbols and the rough estimation points;

performing Euclidean distance weighted summation on the re-determined four sets respectively, and selecting a demodulation symbol with the minimum weighted summation value from each set as a precise estimation point, so as to obtain four precise estimation points; and performing direct current offset calculation and compensation in accordance with the precise estimation points.

In the method, the step of determining four sets from the plurality of demodulation symbols in accordance with the Euclidean distances between the demodulation symbols comprises:

acquiring two demodulation symbols with the maximum Euclidean distance therebetween from the plurality of demodulation symbols, so as to obtain first and third reference points;

acquiring a set of the demodulation symbols, the Euclidean distances between which and the first and third reference points are less than a first threshold, from the plurality of demodulation symbols respectively, so as to obtain first and third sets;

acquiring two demodulation symbols with the maximum Euclidean distance therebetween from the demodulation symbols of the plurality of demodulation symbols which do not belong to the first and third sets, so as to obtain second and fourth reference points; and acquiring sets of the demodulation symbols, the Euclidean distances between which and the second and fourth reference points are less than the first threshold, from the plurality of demodulation symbols respectively, so as to obtain second and fourth sets.

In the method, the step of determining four sets from the plurality of demodulation symbols in accordance with the Euclidean distances between the demodulation symbols comprises:

acquiring two demodulation symbols with the maximum Euclidean distance therebetween from the plurality of demodulation symbols, so as to obtain first and third reference points;

acquiring a demodulation symbol with the maximum sum of Euclidean distances from the first and third reference points from the plurality of demodulation symbols, so as to obtain a second reference point;

acquiring a demodulation symbol with the maximum sum of Euclidean distances from the first, second and third reference points from the plurality of demodulation symbols, so as to obtain a fourth reference points; and acquiring sets of the demodulation symbols, the Euclidean distances between which and the first, second, third and fourth reference points are less than a first threshold, from the plurality of demodulation symbols respectively, so as to obtain first, second, third and fourth sets.

The first threshold is a product of the Euclidean distance between the first and third reference points and a first coefficient.

In the method, the step of performing Euclidean distance weighted summation on the determined four sets respectively, and selecting the demodulation symbol with the minimum weighted summation value from each set as the rough estimation point for the QPSK modulation comprises:

with respect to each of the determined four sets, calculating a sum of squared Euclidean distances between each demodulation symbol and all the other demodulation symbols in the set, and selecting a demodulation symbol with the minimum sum of squares as the rough estimation point corresponding to the set.

In the method, the step of re-determining four sets from the plurality of demodulation symbols in accordance with the Euclidean distances between the demodulation symbols and the rough estimation points comprises:

with respect to each rough estimation point, acquiring a set of the demodulation symbols, the Euclidean distances between which and the rough estimation point are less than a second threshold, from the plurality of demodulation symbols, so as to re-determine four sets.

The second threshold is a product of a smaller one of the first and second Euclidean distances and a second coefficient. The first Euclidean distance is a length of a diagonal line of a quadrilateral formed by the four rough estimation points, and the second Euclidean distance is a length of another diagonal line of the quadrilateral.

In the method, the step of performing Euclidean distance weighted summation on the re-determined four sets respectively, and selecting the demodulation symbol with the minimum weighted summation value from each set as the precise estimation point comprises:

with respect to each of the re-determined four sets, calculating a sum of squared Euclidean distances between each demodulation symbol and all the other demodulation symbols in the set, and selecting a demodulation symbol with the minimum sum of squares as the precise estimation point corresponding to the set.

In the method, the step of performing direct current offset calculation and compensation in accordance with the precise estimation points comprises:

calculating average values of real parts and imaginary parts of the four precise estimation points respectively, so as to obtain a real part and an imaginary part of a direct current estimation value; and with respect to each of the plurality of demodulation symbols, subtracting the real part and the imaginary part of the direct current estimation value from the real part and the imaginary part of the demodulation symbol respectively, so as to obtain a demodulation symbol for eliminating the direct current offset.

The method further comprises the step of:

judging whether the precise estimation points meet a predetermined condition, if yes, executing the step of performing direct current offset calculation and compensation in accordance with the precise estimation points, and otherwise not executing the step of performing direct current offset calculation and compensation in accordance with the precise estimation points.

The predetermined condition may be one or a combination of the following conditions:

where an angle between a first line and a second line is greater than a third threshold, the first line being a diagonal line of a quadrilateral formed by the four precise estimation points and the second line being another diagonal line of the quadrilateral;

where the number of the demodulation symbols included in each of the re-determined four sets is greater than a fourth threshold; and where a ratio of the number of the demodulation symbols included in each of the re-determined four sets to the number of the plurality of demodulation symbols is greater than a fifth threshold.

The present invention further provides an apparatus for eliminating direct current offset, comprising:

an Euclidean distance calculating module, configured to calculate Euclidean distances between every two demodulation symbols of a plurality of demodulation symbols based on Quadrature Phase Shift Keying (QPSK) modulation;

a first determining module, configured to determine four sets from the plurality of demodulation symbols in accordance with the Euclidean distances between the demodulation symbols, each set corresponding to a modulation direction for the QPSK modulation;

a rough estimating module, configured to perform Euclidean distance weighted summation on the determined four sets respectively, and select a demodulation symbol with the minimum weighted summation value from each set as a rough estimation point for the QPSK modulation, so as to obtain four rough estimation points;

a second determining module, configured to re-determine four sets from the plurality of demodulation symbols in accordance with the Euclidean distances between the demodulation symbols and the rough estimation points;

a precise estimating module, configured to perform Euclidean distance weighted summation on the re-determined four sets respectively, and select a demodulation symbol with the minimum weighted summation value from each set as a precise estimation point, so as to obtain four precise estimation points; and a direct current offset eliminating module, configured to perform direct current offset calculation and compensation in accordance with the precise estimation points.

In the apparatus, the first determining module is further configured to:

acquire two demodulation symbols with the maximum Euclidean distance therebetween from the plurality of demodulation symbols, so as to obtain first and third reference points;

acquire a set of the demodulation symbols, the Euclidean distances between which and the first and third reference points are less than a first threshold, from the plurality of demodulation symbols respectively, so as to obtain first and third sets;

acquire two demodulation symbols with the maximum Euclidean distance therebetween from the demodulation symbols of the plurality of demodulation symbols which do not belong to the first and third sets, so as to obtain second and fourth reference points; and acquire sets of the demodulation symbols, the Euclidean distances between which and the second and fourth reference points are less than the first threshold, from the plurality of demodulation symbols respectively, so as to obtain second and fourth sets.

In the apparatus, the first determining module is further configured to:

acquire two demodulation symbols with the maximum Euclidean distance therebetween from the plurality of demodulation symbols, so as to obtain first and third reference points;

acquire the demodulation symbol with the maximum sum of Euclidean distances from the first and third reference points from the plurality of demodulation symbols, so as to obtain a second reference point;

acquire the demodulation symbol with the maximum sum of Euclidean distances from the first, second and third reference points from the plurality of demodulation symbols, so as to obtain a fourth reference points; and acquire sets of the demodulation symbols, the Euclidean distances between which and the first, second, third and fourth reference points are less than a first threshold, from the plurality of demodulation symbols respectively, so as to obtain first, second, third and fourth sets.

The first threshold is a product of the Euclidean distance between the first and third reference points and a first coefficient.

In the apparatus, the rough estimating module is further configured to:

with respect to each of the determined four sets, calculate a sum of squared Euclidean distances between each demodulation symbol and all the other demodulation symbols in the set, and select a demodulation symbol with the minimum sum of squares as the rough estimation point corresponding to the set.

In the apparatus, the second determining module is further configured to:

with respect to each rough estimation point, acquire a set of the demodulation symbols, the Euclidean distances between which and the rough estimation point are less than a second threshold, from the plurality of demodulation symbols, so as to re-determine four sets.

The second threshold is a product of a smaller one of the first and second Euclidean distances and a second coefficient.

The first Euclidean distance is a length of a diagonal line of a quadrilateral formed by the four rough estimation points, and the second Euclidean distance is a length of another diagonal line of the quadrilateral.

In the apparatus, the precise estimating module is further configured to:

with respect to each of the re-determined four sets, calculate a sum of squared Euclidean distances between each demodulation symbol and all the other demodulation symbols in the set, and select a demodulation symbol with the minimum sum of squares as the precise estimation point corresponding to the set.

In the apparatus, the direct current offset eliminating module is further configured to:

calculate average values of real parts and imaginary parts of the four precise estimation points respectively, so as to obtain a real part and an imaginary part of a direct current estimation value; and with respect to each of the plurality of demodulation symbols, subtract the real part and the imaginary part of the direct current estimation value from the real part and the imaginary part of the demodulation symbol respectively, so as to obtain a demodulation symbol for eliminating the direct current offset.

The apparatus further comprises:

a judging module, configured to judge whether the precise estimation points meet a predetermined condition, if yes, trigger the direct current offset eliminating module, and otherwise not trigger the direct current offset eliminating module.

The predetermined condition may be one or a combination of the following conditions:

where an angle between a first line and a second line is greater than a third threshold, the first line being a diagonal line of a quadrilateral formed by the four precise estimation points and the second line being another diagonal line of the quadrilateral;

where the number of the demodulation symbols included in each of the re-determined four sets is greater than a fourth threshold; and where a ratio of the number of the demodulation symbols included in each of the re-determined four sets to the number of the plurality of demodulation symbols is greater than a fifth threshold.

As compared to the prior art, the present invention has the following advantages.

According to the present invention, the demodulation symbols based on the QPSK modulation are grouped so as to distribute the demodulation symbols around the corresponding QPSK modulation points, thereby to estimate the position of the maximum likelihood modulation point and further find out the direct current offset of the demodulation symbol. As a result, it is able to eliminate the direct current offset in the received signal in an accurate and effective manner.

The present invention has the advantages of simple implementation, moderate computation and wide application range, and thus can be easily deployed in most of the receivers based on software radio technology but without altering the structure thereof. In addition, it can eliminate the direct current offset in an accurate and reliable manner, thereby can improve the demodulation performance of a system and ensure normal operation and stable transmission rate of the system.

DETAILED DESCRIPTION

In order to make the purposes, the technical solutions and the advantages of the present invention more apparent, the present invention may be described in details in conjunction with the drawings and the embodiments.

Figure 1:
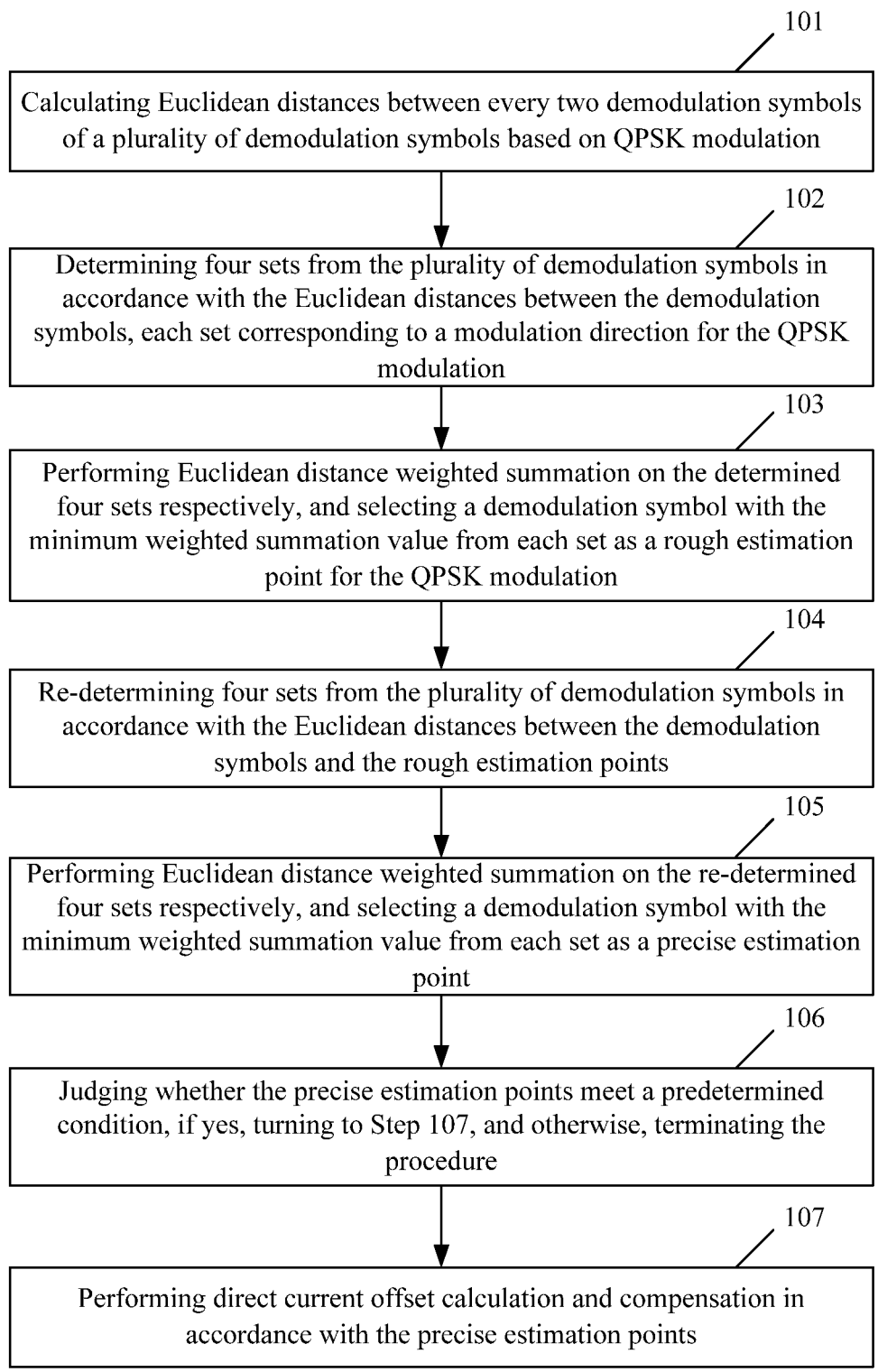
FIG. 1 is a flow chart of a method for eliminating direct current offset according to embodiments of the present invention.

Referring to FIG. 1, the present invention provides a method for eliminating direct current offset, which comprises the following steps.

Step 101: calculating Euclidean distances between every two demodulation symbols of a plurality of demodulation symbols based on QPSK modulation.

In the present invention, the process is performed with respect to a received signal based on QPSK modulation. At first, channel estimation and signal equalization are performed on the received signal to obtain the demodulation symbols which can be normalized. After a plurality of demodulation symbols have been obtained, Euclidean distances between every two demodulation symbols of the plurality of demodulation symbols are calculated.

Step 102: determining four sets from the plurality of demodulation symbols in accordance with the Euclidean distances between the demodulation symbols, each set corresponding to a modulation direction for the QPSK modulation.

This step is used to group the plurality of demodulation symbols for the first time. Here, two modes are provided for the implementation thereof.

Mode 1

Figure 2:
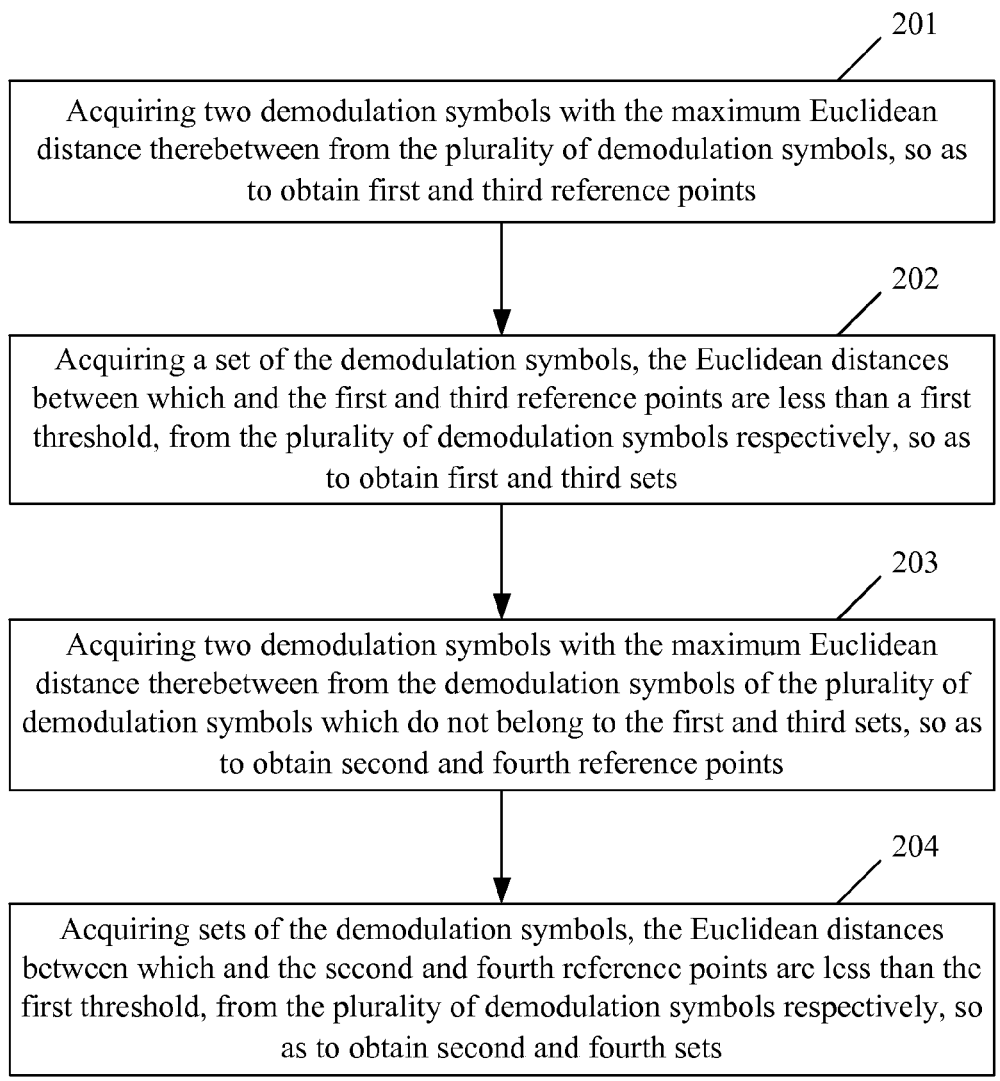
FIG. 2 is a flow chart of a mode 1 to group the demodulation symbols for the first time according to embodiments of the present invention.
Figure 4:
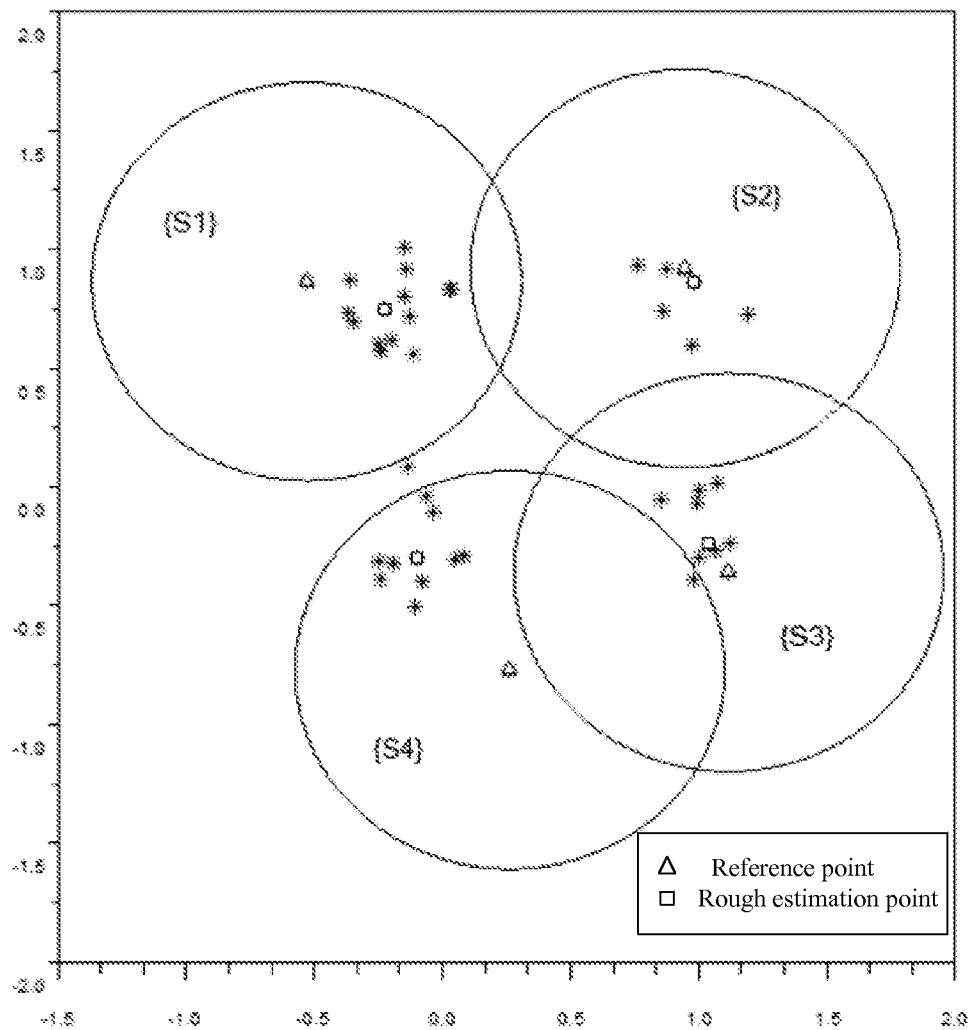
FIG. 4 is a schematic view showing the results after the demodulation symbols are grouped for the first time according to embodiments of the present invention.

Referring to FIGS. 2 and 4, the step of grouping the plurality of demodulation symbols for the first time comprises the following steps:

Step 201: acquiring two demodulation symbols with the maximum Euclidean distance therebetween from the plurality of demodulation symbols, so as to obtain first and third reference points;

Step 202: acquiring a set of the demodulation symbols, the Euclidean distances between which and the first and third reference points are less than a first threshold, from the plurality of demodulation symbols respectively, so as to obtain first and third sets (marked as {S1} and {S3});

Step 203: acquiring two demodulation symbols with the maximum Euclidean distance therebetween from the demodulation symbols of the plurality of demodulation symbols which do not belong to the first and third sets, so as to obtain second and fourth reference points; and Step 204: acquiring sets of the demodulation symbols, the Euclidean distances between which and the second and fourth reference points are less than the first threshold, from the plurality of demodulation symbols respectively, so as to obtain second and fourth sets (marked as {S2} and {S4}).

The four sets {S1}, {S2}, {S3} and {S4} are determined in accordance with the above procedure, and as shown in FIG. 4, each set corresponds to a modulation direction for the QPSK modulation.

The first threshold is a product of the Euclidean distance between the first and third reference points and a first coefficient. By simulation, when the first coefficient ranges from 0.3 to 0.4, a more accurate direct current offset estimation result may be obtained.

Mode 2

Figure 3:
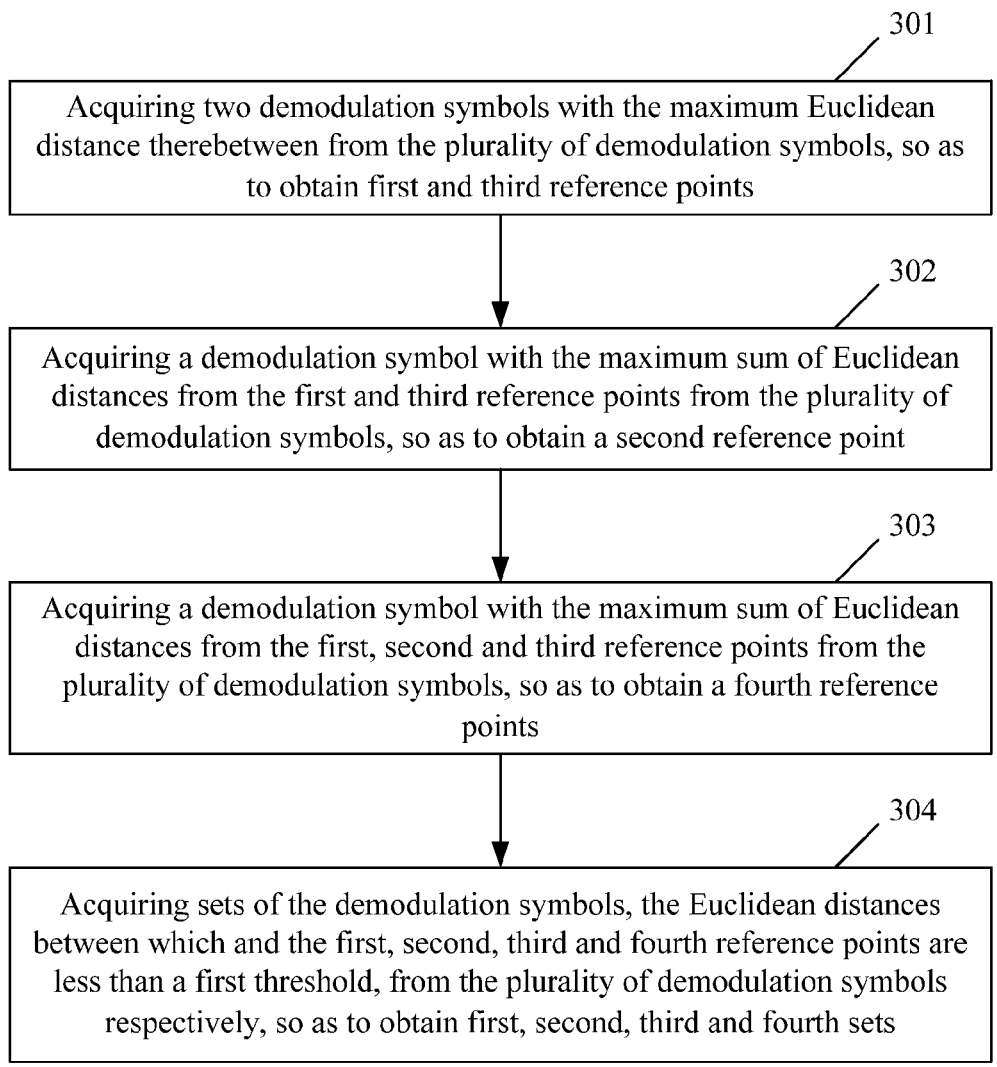
FIG. 3 is a flow chart of a mode 2 to group the demodulation symbols for the first time according to embodiments of the present invention.

Referring to FIGS. 3 and 4, the step of grouping the plurality of demodulation symbols for the first time comprises the following steps:

Step 301: acquiring two demodulation symbols with the maximum Euclidean distance therebetween from the plurality of demodulation symbols, so as to obtain first and third reference points;

Step 302: acquiring a demodulation symbol with the maximum sum of Euclidean distances from the first and third reference points from the plurality of demodulation symbols, so as to obtain a second reference point;

Step 303: acquiring a demodulation symbol with the maximum sum of Euclidean distances from the first, second and third reference points from the plurality of demodulation symbols, so as to obtain a fourth reference points; and Step 304: acquiring sets of the demodulation symbols, the Euclidean distances between which and the first, second, third and fourth reference points are less than a first threshold, from the plurality of demodulation symbols respectively, so as to obtain first, second, third and fourth sets (marked as {S1}, {S2}, {S3} and {S4}).

The four sets {S1}, {S2}, {S3} and {S4} are determined in accordance with the above procedure, and as shown in FIG. 4, each set corresponds to a modulation direction for the QPSK modulation.

The first threshold is a product of the Euclidean distance between the first and third reference points and a first coefficient. By simulation, when the first coefficient ranges from 0.3 to 0.4, a more accurate direct current offset estimation result may be obtained.

Step 103: performing Euclidean distance weighted summation on the determined four sets respectively, and selecting a demodulation symbol with the minimum weighted summation value from each set as a rough estimation point for the QPSK modulation, so as to obtain four rough estimation points.

The Euclidean distance weighted summation refers to calculating the $n^{th}$ (n is a weight) power of the Euclidean distance between each symbol and the others with respect to a set including a plurality of symbols, and accumulating the obtained results to obtain a weighted summation value corresponding to the symbol. The weight n may be set in accordance with the practical need, e.g., between 1 and 3.

In this embodiment, if the weight n is set as 2, Step 103 specifically comprises: with respect to each of the determined four sets, calculating a sum of squared Euclidean distances between each demodulation symbol and all the other demodulation symbols in the set, and selecting a demodulation symbol with the minimum sum of squares as the rough estimation point corresponding to the set. As a result, four rough estimation points are obtained.

Step 104: re-determining four sets from the plurality of demodulation symbols in accordance with the Euclidean distances between the demodulation symbols and the rough estimation points.

Figure 5:
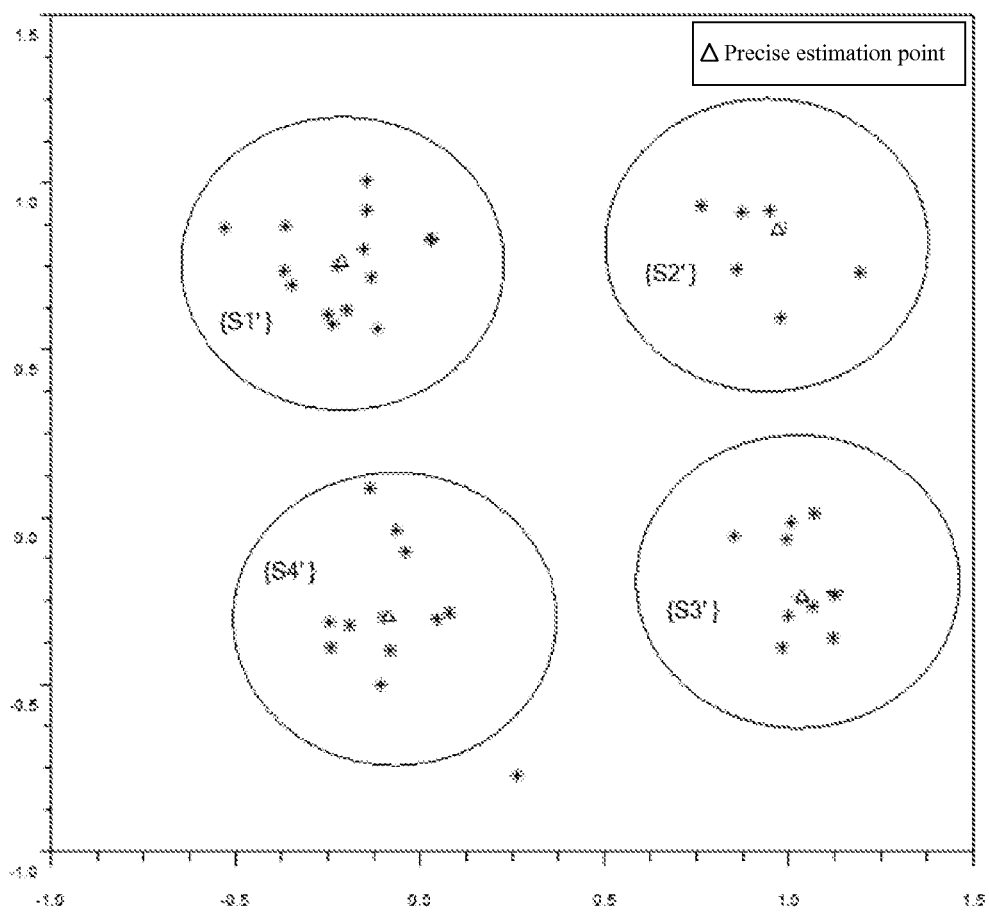
FIG. 5 is a schematic view showing the results after the demodulation symbols are grouped for the second time according to embodiments of the present invention.

To be specific, this step comprises: with respect to each rough estimation point, acquiring a set of the demodulation symbols, the Euclidean distance between which and the rough estimation point is less than a second threshold, from the plurality of demodulation symbols, so as to re-determine four sets. Referring to FIG. 5, the re-determined four sets are {S1'}, {S2'}, {S3'} and {S4'}.

The second threshold is a product of a smaller one of the first and second Euclidean distances and a second coefficient. The first Euclidean distance is the length of a diagonal line of a quadrilateral formed by the four rough estimation points, and the second Euclidean distance is the length of another diagonal line of the quadrilateral. By simulation, when the second coefficient ranges from 0.25 to 0.3, a more accurate direct current offset estimation result may be obtained.

Step 105: performing Euclidean distance weighted summation on the re-determined four sets respectively, and selecting a demodulation symbol with the minimum weighted summation value from each set as a precise estimation point, so as to obtain four precise estimation points.

In this embodiment, if the weight n is set as 2, Step 105 specifically comprises: with respect to each of the re-determined four sets, calculating a sum of squared Euclidean distances between each demodulation symbol and all the other demodulation symbols in the set, and selecting a demodulation symbol with the minimum sum of squares as the precise estimation point corresponding to the set. As a result, four precise estimation points are obtained.

Step 106: judging whether the precise estimation points meet a predetermined condition, if yes, turning to Step 107, and otherwise, terminating the procedure.

This step is an optional one for the purpose of evaluating the selected precise estimation points, thereby preventing the occurrence of detection errors. When it is determined that the precise estimation points meet the predetermined condition, the step of performing direct current offset calculation and compensation is executed in accordance with the precise estimation points, and otherwise such a step is not executed.

The predetermined condition may be one or a combination of the following conditions:

where an angle between a first line and a second line is greater than a third threshold (e.g., 60°), the first line being a diagonal line of a quadrilateral formed by the four precise estimation points and the second line being another diagonal line of the quadrilateral;

where the number of the demodulation symbols included in each of the re-determined four sets is greater than a fourth threshold (e.g., an eighth of the total number of the demodulation symbols); and where a ratio of the number of the demodulation symbols included in each of the re-determined four sets to the number of the plurality of demodulation symbols is greater than a fifth threshold (e.g., 80%).

The third, fourth and fifth thresholds may be adjusted in accordance with the practical need.

Step 107: performing direct current offset calculation and compensation in accordance with the precise estimation points.

To be specific, this step comprises: calculating average values of real parts and imaginary parts of the four precise estimation points respectively, so as to obtain a real part and an imaginary part of a direct current estimation value; and with respect to each of the plurality of demodulation symbols, subtracting the real part and the imaginary part of the direct current estimation value from the real part and the imaginary part of the demodulation symbol respectively, so as to obtain a demodulation symbol for eliminating the direct current offset.

Figure 6:
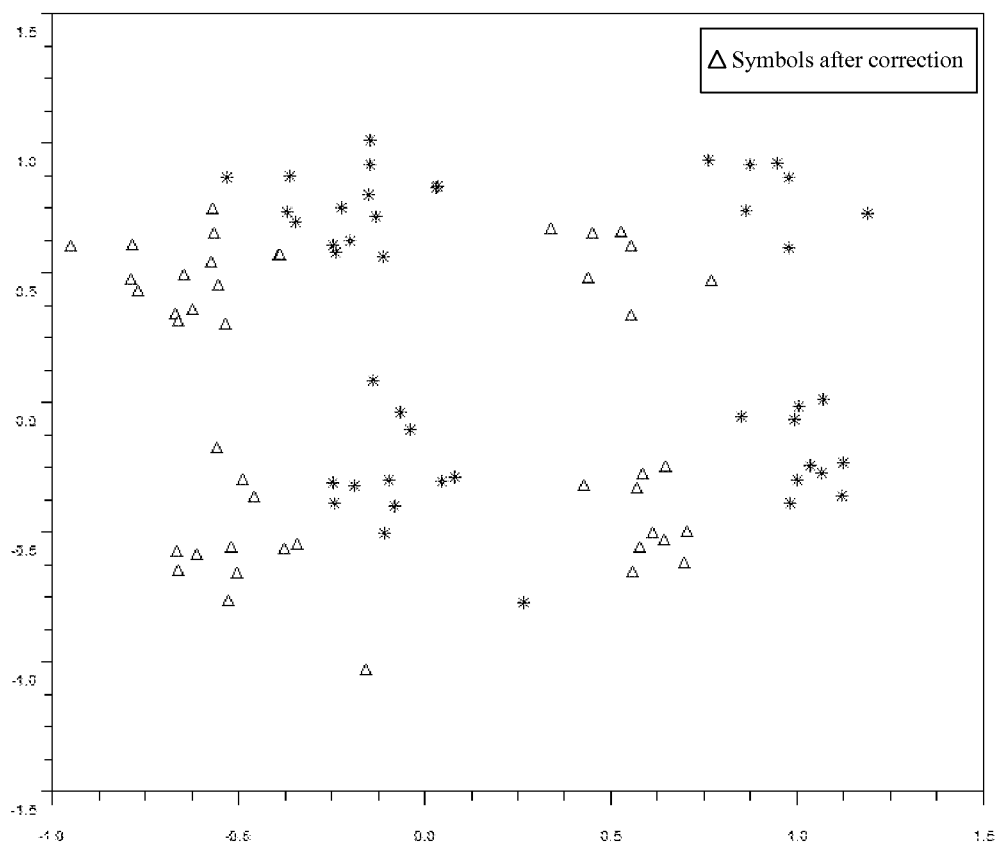
FIG. 6 is a schematic view showing the effect on the elimination of direct current offset according to embodiments of the present invention.

As shown in FIG. 6, which is a schematic view showing the effect on the elimination of direct current offset according to the embodiment of the present invention, the direct current offset in the received signal can be eliminated in an accurate and effective manner by using the method of the present invention.

Figure 7:
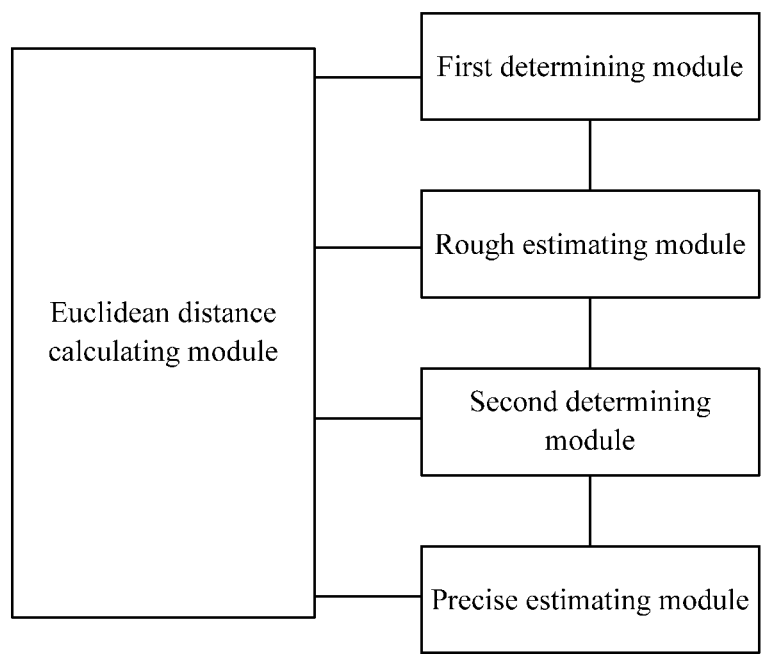
FIG. 7 is a structural schematic view showing an apparatus for eliminating direct current offset according to embodiments of the present invention.

Correspondingly, the present invention further provides an apparatus for eliminating direct current offset which, as shown in FIG. 7, the apparatus comprises:

an Euclidean distance calculating module, configured to calculate Euclidean distances between every two demodulation symbols of a plurality of demodulation symbols based on QPSK modulation;

a first determining module, configured to determine four sets from the plurality of demodulation symbols in accordance with the Euclidean distances between the demodulation symbols, each set corresponding to a modulation direction for the QPSK modulation;

a rough estimating module, configured to perform Euclidean distance weighted summation on the determined four sets respectively, and selecting a demodulation symbol with the minimum weighted summation value from each set as a rough estimation point for the QPSK modulation, so as to obtain four rough estimation points;

a second determining module, configured to re-determine four sets from the plurality of demodulation symbols in accordance with the Euclidean distances between the demodulation symbols and the rough estimation points;

a precise estimating module, configured to perform Euclidean distance weighted summation on the re-determined four sets respectively, and selecting a demodulation symbol with the minimum weighted summation value from each set as a precise estimation point, so as to obtain four precise estimation points; and a direct current offset eliminating module, configured to perform direct current offset calculation and compensation in accordance with the precise estimation points.

In order to prevent the occurrence of detection error, in another embodiment, the apparatus further comprises a judging module (not shown) configured to judge whether the precise estimation points meet a predetermined condition, if yes, trigger the direct current offset eliminating module, and otherwise not trigger the direct current offset eliminating module.

For the specific execution flows of the modules and the setting of the parameters, please refer to the above method embodiments, and they will not be repeated herein.

In a word, according to the present invention, the demodulation symbols based on the QPSK modulation are grouped so as to distribute the demodulation symbols around the corresponding QPSK modulation points, thereby to estimate the position of the maximum likelihood modulation point and further find out the direct current offset of the demodulation symbol. As a result, it is able to eliminate the direct current offset in the received signal in an accurate and effective manner.

The present invention has the advantages of simple implementation, moderate computation and wide application range, and thus can be easily deployed in most of the receivers based on software radio technology without changing the structure thereof. In addition, it can eliminate the direct current offset in an accurate and reliable manner, thereby can improve the demodulation performance of a system and ensure normal operation and stable transmission rate of the system.

It should be appreciated that, the above embodiments are merely used for illustrative purpose but not used to limit the present invention. A person skilled in the art shall understand that any modifications or substitutions may be made to the present invention if without departing from the spirit of the present invention. These modifications or substitutions shall also fall within the scope of the present invention.

What is claimed is:

1. A method for eliminating direct current offset, comprising:

calculating Euclidean distances between every two demodulation symbols of a plurality of demodulation symbols based on Quadrature Phase Shift Keying (QPSK) modulation;

determining four sets from the plurality of demodulation symbols in accordance with the Euclidean distances between the demodulation symbols, each set corresponding to a modulation direction for the QPSK modulation;

performing Euclidean distance weighted summation on the determined four sets respectively, and selecting a demodulation symbol with the minimum weighted summation value from each set as a rough estimation point for the QPSK modulation, so as to obtain four rough estimation points;

re-determining four sets from the plurality of demodulation symbols in accordance with the Euclidean distances between the demodulation symbols and the rough estimation points;

performing Euclidean distance weighted summation on the re-determined four sets respectively, and selecting a demodulation symbol with the minimum weighted summation value from each set as a precise estimation point, so as to obtain four precise estimation points; and performing direct current offset calculation and compensation in accordance with the precise estimation points.

2. The method according to claim 1, wherein the step of determining four sets from the plurality of demodulation symbols in accordance with the Euclidean distances between the demodulation symbols comprises:

acquiring two demodulation symbols with the maximum Euclidean distance therebetween from the plurality of demodulation symbols, so as to obtain first and third reference points;

acquiring a set of the demodulation symbols, the Euclidean distances between which and the first and third reference points are less than a first threshold, from the plurality of demodulation symbols respectively, so as to obtain first and third sets;

acquiring two demodulation symbols with the maximum Euclidean distance therebetween from the demodulation symbols of the plurality of demodulation symbols which do not belong to the first and third sets, so as to obtain second and fourth reference points; and acquiring sets of the demodulation symbols, the Euclidean distances between which and the second and fourth reference points are less than the first threshold, from the plurality of demodulation symbols respectively, so as to obtain second and fourth sets.

3. The method according to claim 1, wherein the step of determining four sets from the plurality of demodulation symbols in accordance with the Euclidean distances between the demodulation symbols comprises:

acquiring two demodulation symbols with the maximum Euclidean distance therebetween from the plurality of demodulation symbols, so as to obtain first and third reference points;

acquiring a demodulation symbol with the maximum sum of Euclidean distances from the first and third reference points from the plurality of demodulation symbols, so as to obtain a second reference point;

acquiring a demodulation symbol with the maximum sum of Euclidean distances from the first, second and third reference points from the plurality of demodulation symbols, so as to obtain a fourth reference points; and acquiring sets of the demodulation symbols, the Euclidean distances between which and the first, second, third and fourth reference points are less than a first threshold, from the plurality of demodulation symbols respectively, so as to obtain first, second, third and fourth sets.

4. The method according to claim 2, wherein the first threshold is a product of the Euclidean distance between the first and third reference points and a first coefficient.

5. The method according to claim 1, wherein the step of performing Euclidean distance weighted summation on the determined four sets respectively, and selecting the demodulation symbol with the minimum weighted summation value from each set as the rough estimation point for the QPSK modulation comprises:

with respect to each of the determined four sets, calculating a sum of squared Euclidean distances between each demodulation symbol and all the other demodulation symbols in the set, and selecting a demodulation symbol with the minimum sum of squares as the rough estimation point corresponding to the set.

6. The method according to claim 1, wherein the step of re-determining four sets from the plurality of demodulation symbols in accordance with the Euclidean distances between the demodulation symbols and the rough estimation points comprises:

with respect to each rough estimation point, acquiring a set of the demodulation symbols, the Euclidean distances between which and the rough estimation point are less than a second threshold, from the plurality of demodulation symbols, so as to re-determine four sets.

7. The method according to claim 6, wherein
the second threshold is a product of a smaller one of the first and second Euclidean distances and a second coefficient;
the first Euclidean distance is a length of a diagonal line of a quadrilateral formed by the four rough estimation points; and
the second Euclidean distance is a length of another diagonal line of the quadrilateral.

8. The method according to claim 1, wherein the step of performing Euclidean distance weighted summation on the re-determined four sets respectively, and selecting the demodulation symbol with the minimum weighted summation value from each set as the precise estimation point comprises:

with respect to each of the re-determined four sets, calculating a sum of squared Euclidean distances between each demodulation symbol and all the other demodulation symbols in the set, and selecting a demodulation symbol with the minimum sum of squares as the precise estimation point corresponding to the set.

9. The method according to claim 1, wherein the step of performing direct current offset calculation and compensation in accordance with the precise estimation points comprises:

calculating average values of real parts and imaginary parts of the four precise estimation points respectively, so as to obtain a real part and an imaginary part of a direct current estimation value; and with respect to each of the plurality of demodulation symbols, subtracting the real part and the imaginary part of the direct current estimation value from the real part and the imaginary part of the demodulation symbol respectively, so as to obtain a demodulation symbol for eliminating the direct current offset.

10. The method according to claim 1, further comprising the step of:

judging whether the precise estimation points meet a predetermined condition, if yes, executing the step of performing direct current offset calculation and compensation in accordance with the precise estimation points, and otherwise not executing the step of performing direct current offset calculation and compensation in accordance with the precise estimation points.

11. The method according to claim 10, wherein the predetermined condition is one or a combination of the following conditions:

where an angle between a first line and a second line is greater than a third threshold, the first line being a diagonal line of a quadrilateral formed by the four precise estimation points and the second line being another diagonal line of the quadrilateral;

where the number of the demodulation symbols included in each of the re-determined four sets is greater than a fourth threshold; and where a ratio of the number of the demodulation symbols included in each of the re-determined four sets to the number of the plurality of demodulation symbols is greater than a fifth threshold.

12. An apparatus for eliminating direct current offset, comprising:

an Euclidean distance calculating module, configured to calculate Euclidean distances between every two demodulation symbols of a plurality of demodulation symbols based on Quadrature Phase Shift Keying (QPSK) modulation;

a first determining module, configured to determine four sets from the plurality of demodulation symbols in accordance with the Euclidean distances between the demodulation symbols, each set corresponding to a modulation direction for the QPSK modulation;

a rough estimating module, configured to perform Euclidean distance weighted summation on the determined four sets respectively, and select a demodulation symbol with the minimum weighted summation value from each set as a rough estimation point for the QPSK modulation, so as to obtain four rough estimation points;

a second determining module, configured to re-determine four sets from the plurality of demodulation symbols in accordance with the Euclidean distances between the demodulation symbols and the rough estimation points;

a precise estimating module, configured to perform Euclidean distance weighted summation on the re-determined four sets respectively, and select a demodulation symbol with the minimum weighted summation value from each set as a precise estimation point, so as to obtain four precise estimation points; and a direct current offset eliminating module, configured to perform direct current offset calculation and compensation in accordance with the precise estimation points.

13. The apparatus according to claim 12, wherein the first determining module is further configured to:

acquire two demodulation symbols with the maximum Euclidean distance there between from the plurality of demodulation symbols, so as to obtain first and third reference points;

acquire a set of the demodulation symbols, the Euclidean distances between which and the first and third reference points are less than a first threshold, from the plurality of demodulation symbols respectively, so as to obtain first and third sets;

acquire two demodulation symbols with the maximum Euclidean distance there between from the demodulation symbols of the plurality of demodulation symbols which do not belong to the first and third sets, so as to obtain second and fourth reference points; and acquire sets of the demodulation symbols, the Euclidean distances between which and the second and fourth reference points are less than the first threshold, from the plurality of demodulation symbols respectively, so as to obtain second and fourth sets.

14. The apparatus according to claim 12, wherein the first determining module is further configured to:

acquire two demodulation symbols with the maximum Euclidean distance there between from the plurality of demodulation symbols, so as to obtain first and third reference points;

acquire the demodulation symbol with the maximum sum of Euclidean distances from the first and third reference points from the plurality of demodulation symbols, so as to obtain a second reference point;

acquire the demodulation symbol with the maximum sum of Euclidean distances from the first, second and third reference points from the plurality of demodulation symbols, so as to obtain a fourth reference points; and acquire sets of the demodulation symbols, the Euclidean distances between which and the first, second, third and fourth reference points are less than a first threshold, from the plurality of demodulation symbols respectively, so as to obtain first, second, third and fourth sets.

15. The apparatus according to claim 13, wherein the first threshold is a product of the Euclidean distance between the first and third reference points and a first coefficient.

16. The apparatus according to claim 12, wherein the rough estimating module is further configured to:

with respect to each of the determined four sets, calculate a sum of squared Euclidean distances between each demodulation symbol and all the other demodulation symbols in the set, and select a demodulation symbol with the minimum sum of squares as the rough estimation point corresponding to the set.

17. The apparatus according to claim 12, wherein the second determining module is further configured to:

with respect to each rough estimation point, acquire a set of the demodulation symbols, the Euclidean distances between which and the rough estimation point are less than a second threshold, from the plurality of demodulation symbols, so as to re-determine four sets.

18. The apparatus according to claim 17, wherein the second threshold is a product of a smaller one of the first and second Euclidean distances and a second coefficient;

the first Euclidean distance is a length of a diagonal line of a quadrilateral formed by the four rough estimation points; and the second Euclidean distance is a length of another diagonal line of the quadrilateral.

19. The apparatus according to claim 12, wherein the precise estimating module is further configured to:

with respect to each of the re-determined four sets, calculate a sum of squared Euclidean distances between each demodulation symbol and all the other demodulation symbols in the set, and select a demodulation symbol with the minimum sum of squares as the precise estimation point corresponding to the set.

20. The apparatus according to claim 12, wherein the direct current offset eliminating module is further configured to:

calculate average values of real parts and imaginary parts of the four precise estimation points respectively, so as to obtain a real part and an imaginary part of a direct current estimation value; and with respect to each of the plurality of demodulation symbols, subtract the real part and the imaginary part of the direct current estimation value from the real part and the imaginary part of the demodulation symbol respectively, so as to obtain a demodulation symbol for eliminating the direct current offset.

21. The apparatus according to claim 12, further comprising:

a judging module, configured to judge whether the precise estimation points meet a predetermined condition, if yes, trigger the direct current offset eliminating module, and otherwise not trigger the direct current offset eliminating module.

22. The apparatus according to claim 21, wherein the predetermined condition is one or a combination of the following conditions:

where an angle between a first line and a second line is greater than a third threshold, the first line being a diagonal line of a quadrilateral formed by the four precise estimation points and the second line being another diagonal line of the quadrilateral;

where the number of the demodulation symbols included in each of the re-determined four sets is greater than a fourth threshold; and where a ratio of the number of the demodulation symbols included in each of the re-determined four sets to the number of the plurality of demodulation symbols is greater than a fifth threshold.

\* \* \* \* \*